(12) United States Patent
Keller et al.

(10) Patent No.: US 7,836,581 B2
(45) Date of Patent: Nov. 23, 2010

(54) DEVICE FOR INSTALLING AND REMOVING A ROLLER SUPPORTING A BEARING ASSEMBLY

(75) Inventors: Karl Keller, Hilchenbach (DE); Konrad Roeingh, Hilchenbach (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 1333 days.

(21) Appl. No.: 10/566,314

(22) PCT Filed: Jun. 17, 2004

(86) PCT No.: PCT/EP2004/006523

§ 371 (c)(1),
(2), (4) Date: Jan. 27, 2006

(87) PCT Pub. No.: WO2005/021175

PCT Pub. Date: Mar. 10, 2005

(65) Prior Publication Data

US 2007/0107210 A1    May 17, 2007

(30) Foreign Application Priority Data

Jul. 31, 2003    (DE) ................ 103 35 527

(51) Int. Cl.
*B21D 53/10* (2006.01)

(52) U.S. Cl. ............... 29/724; 29/426.5; 29/259; 29/898.08; 29/263; 29/898.062; 384/540

(58) Field of Classification Search ............... 29/724, 29/525, 426.5, 259, 898.08, 263, 898.062; 384/540; 411/14.5
See application file for complete search history.

(56) References Cited

U.S. PATENT DOCUMENTS

| | | | | |
|---|---|---|---|---|
| 5,333,378 A | * | 8/1994 | Sjobom | 29/898.08 |
| 5,535,517 A | * | 7/1996 | Rode | 29/898.09 |

FOREIGN PATENT DOCUMENTS

| | | |
|---|---|---|
| DE | 199 45 070 | 3/2001 |
| DE | 199 56 942 | 5/2001 |
| EP | 1 072 333 | 1/2001 |
| EP | 1 214 158 | 10/2003 |
| WO | 03/022471 | 3/2003 |

* cited by examiner

*Primary Examiner*—Rick K Chang
(74) *Attorney, Agent, or Firm*—Lucas & Mercanti, LLP; Klaus P. Stoffel

(57) ABSTRACT

The invention relates to a device for installing and removing a bearing assembly (3) which consists of a chock in which a trunnion hearing is arranged on a supporting roller stud (1) of a rolling stand. The aim of said invention is to replace said assembly by means of an operationally reliable device without carrying out modifications or large-scale modifications of the supporting roller stud (1), in particular to obtain reproducible mounting forces in order to ensure best long-term wear-less service possible, best possible rotation and easily controlled stripping forces for reliable operation of the rolling stand. The invention also relates to a nut (8) fixed to the roller stud (1) prestressed against the bearing assembly (3). According to said invention, a stripping device (11) can be temporarily coupled to the bearing assembly (3), the hydraulic cylinder (15) thereof resting against the roller stud (1).

10 Claims, 2 Drawing Sheets

DEVICE FOR INSTALLING AND REMOVING A ROLLER SUPPORTING A BEARING ASSEMBLY

BACKGROUND OF THE INVENTION

The invention concerns a device for mounting and dismounting a bearing assembly of the roll neck of the backup roll of a rolling stand, wherein the bearing assembly comprises a chock and a roll neck bearing mounted in the chock.

It has long been known how to support backup rolls of rolling stands in bearing assemblies, e.g., Morgoil bearings. Nuts are still widely used for mounting the bearing assemblies on and dismounting them from the roll necks. The bearing assembly can be mechanically mounted on the journal with these nuts. To dismount the bearing assembly, after removal of the mechanical nuts, the bearing assembly is dismounted from the roll neck by means of levers, wedges, and the like or by ramming heavy weights, e.g., another roll, against the chocks.

However, it is also well known that the bearing assembly can be equipped with projections that enclose both flanks of the nut, so that when the nut is screwed on, the bearing assembly is mounted, and when the nut is unscrewed, the bearing assembly is dismounted. The large forces that this requires are often applied by winding a crane cable around the nut and loosening or tightening the nut by a lifting movement of the crane. This method of tightening or loosening the nut is extremely dangerous, since operating personnel can be injured if the tensioned crane cable slips.

Hydraulic mounting and dismounting devices built into the bearing assembly for mounting and dismounting the bearing assemblies of roll necks are also known, which always remain in each of the bearing assembles and can be coupled with external hydraulic sources to carry out the mounting or dismounting. However, these devices for mounting and dismounting the bearing assembles are complicated and expensive. Existing rolls that use only mechanical nuts for mounting and dismounting can be retrofitted with this type of mounting and dismounting device only with considerable, cost-intensive changes in the roll neck. Therefore, this type of retrofitting is not economically feasible.

In addition, hydraulic mounting and dismounting devices are known which can be temporarily coupled with the bearing assembly, but special designs of the journals are also necessary to allow them to be flange-mounted on the journals.

The replacement of the mechanical nut for the mounting of bearing assemblies by a hydraulic nut has also been proposed. However, after the hydraulic nut has been removed, here again it is necessary to remove the bearing assemblies from the roll neck by means of levers, wedges, the aforementioned ramming, etc.

The initially described mechanical nuts for mounting bearing assemblies on backup roll necks are still widely used. However, these nuts do not meet required safety standards with respect to mounting by crane and with respect to dismounting by levers, wedges, ramming, etc.

SUMMARY OF THE INVENTION

The objective of the invention is to replace mounting and dismounting devices of this type with devices that provide greater operating safety without having to make any changes or any major changes in the existing roll necks. In particular, reproducible mounting forces should provide a long service life and operation with as little wear as possible and should ensure extremely high true-running properties, and easily controllable dismounting forces should provide safe operation of the rolling stands.

To this end, a nut that can be secured on the roll neck and that can be supported with pretensioning on the bearing assembly is proposed. This mounting unit alone provides the advantage that the bearing assembly is seated on the roll neck with predeterminable pretensioning, so that no play arises between the bearing assembly and the roll neck during operation, which ensures extremely high true-running properties and minimal wear, if any.

In the case of the previously known, mechanical nuts for mounting the bearing assembly on the roll neck or in the case of mechanical lock nuts of the hydraulic nuts, the nuts were first securely screwed onto the roll neck. To prevent the nut from loosening during the rolling operation, a securing element was placed through the nut into a bolt circle provided in the bearing assembly. To ensure that the perforation of the nut and the bolt circle coincided, it often happened that the nut had to be turned back slightly to allow insertion of the securing element. This resulted in play between the bearing assembly and the roll neck, which leads to untrue running and to undesirable wear during operation.

The pretensioned nut proposed in accordance with the invention is tensioned as follows. First, the bearing assembly is mounted on the roll neck by means of a hydraulic pretensioning tool. The force of the hydraulic pretensioning tool is adjusted in such a way that a anchorage fixture is pretensioned. After the nut has been screwed down, the hydraulic pretensioning tool is depressurized. The pretensioning of the anchorage fixture is then transmitted from the anchorage fixture, which is rigidly connected with the roll neck, to the bearing assembly via the nut.

To dismount a bearing assembly from the roll neck of the backup roll of a rolling stand, the invention proposes a dismounting unit, which can be temporarily coupled with the bearing assembly, and whose hydraulic cylinder can be supported on the roll neck or on the anchorage fixture that is rigidly connected with the roll neck.

In this regard, the dismounting unit can be bolted together, e.g., with the end plate of the bearing assembly. However, there is also the possibility of providing the bearing assembly and the dismounting unit with a bayonet socket or to provide the dismounting unit with claws that can grip behind regions of the bearing assembly.

In this regard, it has been found to be an advantage for the dismounting device to act on the bearing assembly in such a way that there is a uniform coupling possibility with both bearing assemblies of a roll, which generally have different inside dimensions, so that the dismounting unit can be universally used for both ends of a roll.

It is also possible to operate the dismounting unit with a previously known hydraulic nut or even with a previously known mechanical nut for mounting the bearing on the roll neck. However, it is especially advantageous if both the dismounting unit of the invention and the mounting unit of the invention are used.

BRIEF DESCRIPTION OF THE DRAWING

The invention is explained in greater detail below in connection with a description of the drawings.

DETAILED DESCRIPTION OF THE INVENTION

Figure 1:
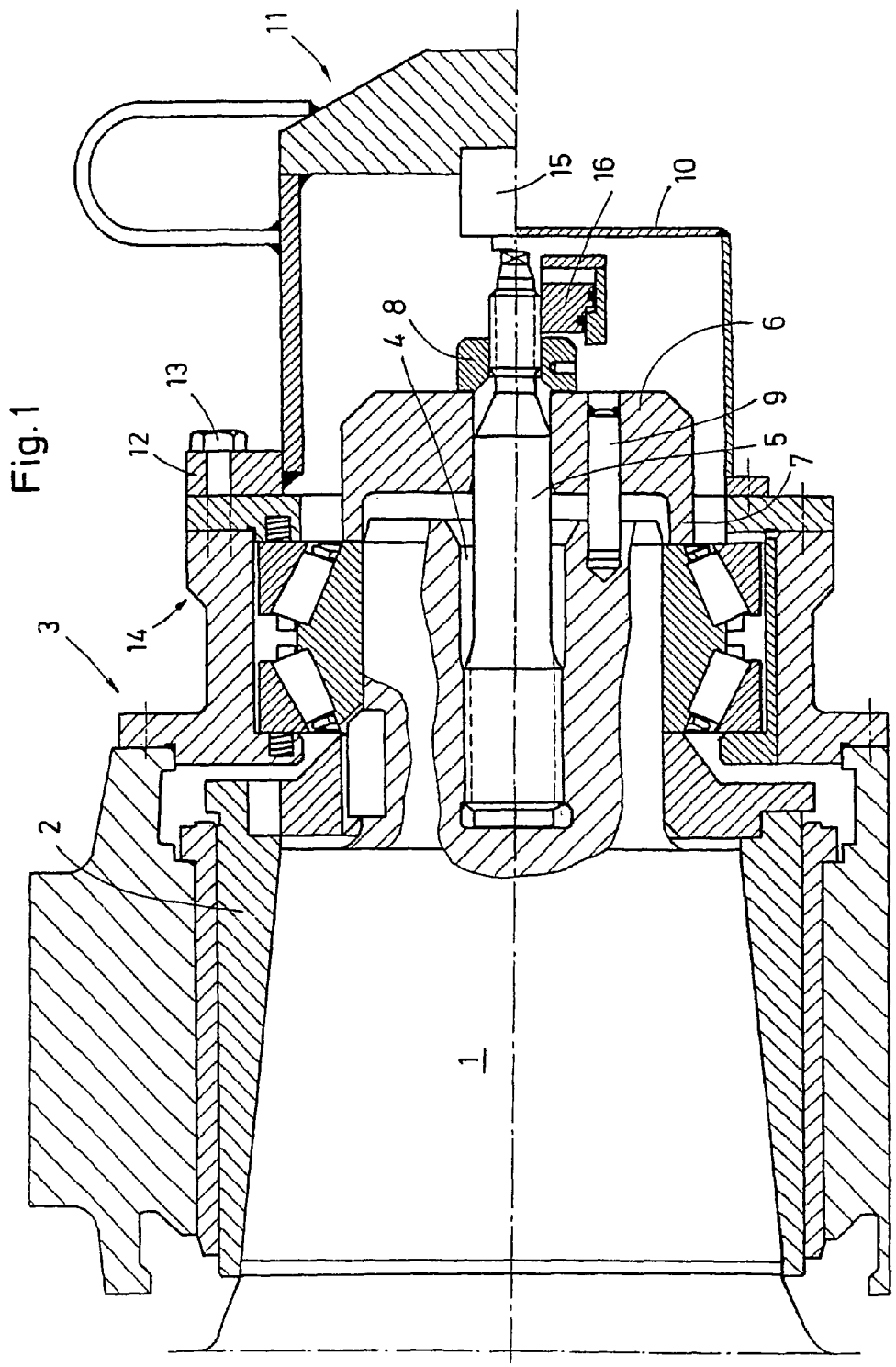
FIG. 1 shows the mounting and dismounting device in accordance with the invention.

FIG. 1 shows a roll neck 1, on which the roll neck bushing 2 of a bearing assembly 3 is mounted. The end region of the roll neck 1 has a bore 4, into which an internal thread has been cut. A anchorage fixture 5 is screwed torsion-free with its external thread into the internal thread of the bore 4. In this regard, especially in the case of roll necks made of a cast material, which can have defects, a special thread can be used, by which a uniform distribution of the tensile forces to the individual thread flights is achieved. A cap disk 6 with a cup-shaped design is mounted on the anchorage fixture 5 in such a way that it can be axially displaced, and the edge 7 of the cup-shaped cap disk 6 is supported on the bearing assembly 3, in the present case, on the axial bearing of the bearing assembly 3. At the opposite end of the anchorage fixture 5 from its end that is screwed into the roll neck 1, the anchorage fixture 5 has another external thread, on which a nut 8 is mounted. As FIG. 1 shows, a hydraulic pretensioning tool 16 can be temporarily assigned to the nut 8.

This pretensionable mounting device operates as follows: The hydraulic pretensioning tool 16 is supported on the anchorage fixture 5 and moves the cap disk 6 towards the bearing assembly 3. This causes the roll neck bushing 2 of the bearing assembly 3 to be pushed onto the roll neck 1. If the roll neck bushing 2 is securely seated on the roll neck 1, additional pressure is applied to the hydraulic pretensioning tool 16, so that the anchorage fixture 5 elastically expands. After a predetermined elastic expansion has been reached, the nut 8 is screwed down against cap disk 6. After the hydraulic pressure of the hydraulic pretensioning tool 16 has been turned off, the anchorage fixture 5, which is rigidly connected with the roll neck 1, pulls the bearing assembly 3 by means of the nut 8 and the cap disk 6 onto the roll neck 1 with the suitably adjusted elastic pretensioning of the anchorage fixture. In this regard, the pretensioning force that permanently operates between the anchorage fixture 5 and nut 8 during operation causes the nut 8 to be irreversibly secured against torsion.

The cap disk 6 has an anti-twisting element 9, so that neither the cap disk 6 nor the nut 8 can loosen during the rolling operation. Reproducible mounting force is thus provided by the hydraulically pretensioned anchorage fixture 5. The hydraulic pretensioning tool 16 is operated simply and reliably by external hydraulic pumps. The roll neck 1 and the bearing assembly 3 are kept frictionally connected by the anchorage fixture 5. This results in better tensioning of the bearing assembly with the roll neck than in the prior art, which in turn results in excellent true-running properties and a wear-free connection.

It is not necessary to change the outer contour of the roll neck surface during a retrofit in which a mounting device with, e.g., a mechanical nut or a hydraulic nut is replaced by a mounting device of the invention.

FIG. 1 also shows a cover 10, which protects the bearing assembly 3 during operation and can be swung away or removed during the mounting or dismounting of the bearing assembly.

The drawing also shows a dismounting device 11, which has a cup-shaped design and whose edge 12 can be bolted to the bearing assembly 3 with bolts 13 for the purpose of dismounting the bearing assembly from the roll neck 1. Other solutions are also possible here. For example, the edge 12 could be equipped with claws (not shown), which can grip the bearing assembly 3 from behind in the area of the back 14.

The dismounting device 11 has a hydraulic cylinder 15, which is supported in FIG. 1 on the anchorage fixture 5, which is rigidly connected with the roll neck 1.

After removal of the nut 8, a dismounting force can be applied between the roll neck 1 and the bearing assembly 3 by the hydraulic cylinder 15. This allows simple and reliable dismounting of the bearing assembly from the roll neck. Uncontrollable ramming operations are unnecessary.

Figure 2:
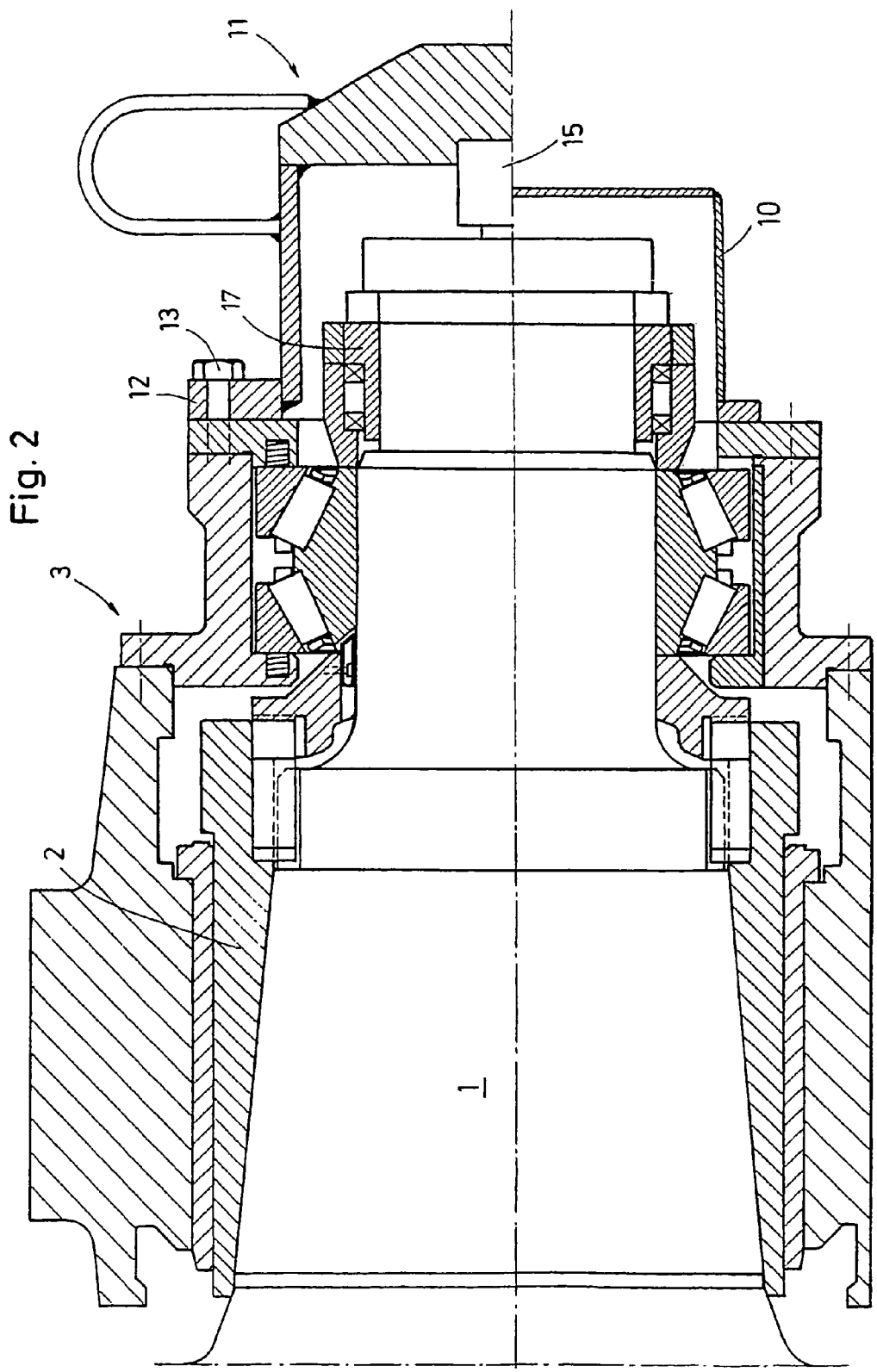
FIG. 2 shows the dismounting device of the invention in combination with a previously known hydraulic nut.

FIG. 2 shows the dismounting device of the invention in combination with a commercial hydraulic nut 17, which can be secured on the roll neck 1 instead of on an anchorage fixture 5. In this application, it is not necessary to make any change in the roll neck, even on its end face. The previously known nuts for mounting bearing assemblies on roll necks, which, of course, can also be used here, merely need to be replaced by the hydraulic nut 17. To dismount the bearing assembly, the hydraulic cylinder 15 acts on the end face of the roll neck 1.

LIST OF REFERENCE NUMBERS 1 roll neck
2 roll neck bushing
3 bearing assembly
4 bore
5 anchorage fixture
6 cap disk
7 edge
8 hydraulic nut
9 anti-twisting element
10 cover
11 dismounting unit
12 edge
13 bolt
14 back
15 hydraulic cylinder
16 hydraulic pretensioning tool
17 hydraulic nut

The invention claimed is:

1. A device for mounting a bearing assembly (3), which comprises a chock and a roll neck bearing mounted in the chock, on a roll neck (1) of a backup roll of a rolling stand and for dismounting a bearing assembly (3) from the roll neck (1) of the backup roll of the rolling stand, wherein an anchorage fixture (5), which extends in the axial direction of the roll, acts on the roll neck (1), the anchorage fixture (5) supports a washer (6) that is axially displaceable on the anchorage fixture (5), which washer (6) is directly supported at one end on a nut (8) that can be moved on the anchorage fixture (5) by screwing and at the other end on the bearing assembly (3); a hydraulic pretensioning tool (16) can be temporarily assigned to the nut (8) and can apply a mounting force between the anchorage fixture (5) and the washer (6), which is supported on the bearing assembly (3), a dismounting unit (11) can be temporarily coupled with the bearing assembly (3); and a hydraulic cylinder (15) of the dismounting unit (11) can be supported on the roll neck (1).

2. The device in accordance with claim 1, wherein the nut (8) can be screwed down against the washer (6) with the anchorage fixture (5) pretensioned and is irreversibly secured against torsion by the tensioning forces between the anchorage fixture (5) and the nut (8).

3. The device in accordance with claim 1, wherein an anti-twisting element (9) is assigned to the washer (6).

4. The device in accordance with claim 1, wherein when the roll is stopped, the hydraulic pretensioning tool (16) can be coupled to the anchorage fixture (5) and, driven by an external hydraulic source, can be adjusted against the washer (6).

5. The device in accordance with claim 1, wherein the dismounting unit (11) can be universally used for a bearing at either end of a roll.

6. The device in accordance with claim 1, wherein the dismounting unit (11) can be bolted together with the bearing assembly (3).

7. The device in accordance with claim 1, wherein the dismounting unit (11) can be coupled with the bearing assembly (3) by a bayonet socket.

8. The device in accordance with claim 1, wherein the dismounting unit (11) has claws that grip behind the bearing assembly (3).

9. The device in accordance with claim 1, wherein the hydraulic cylinder (15) is supported on the anchorage fixture (5), which is rigidly connected with the roll neck (1).

10. The device in accordance with claim 1, wherein the pretensioning tool (16) and the dismounting unit (11) can be coupled with the bearing assembly (3) separately from each other.

* * * * *